United States Patent Office 3,257,342
Patented June 21, 1966

3,257,342
EPOXY RESINS CURED WITH POLYAMINOPOLY-AMIDES FROM DIAMINOPOLYETHERS AND DI-CARBOXYLIC ACIDS
Joseph N. S. Kwong, St. Paul, Minn., assignor to Minnesota Mining and Manufacturing Company, St. Paul, Minn., a corporation of Delaware
No Drawing. Filed Feb. 19, 1962, Ser. No. 174,263
6 Claims. (Cl. 260—18)

This invention relates to epoxy resin compositions which harden at room temperature to provide tough, adherent cured products, and is particularly concerned with compositions which remain free flowing or workable for usefully long periods (e.g., 1–3 hours) but which cure overnight at ordinary room temperatures with only moderate exotherm. Principally, the novel epoxy resin compositions are used for electrical insulation, e.g., encapsulation and impregnation of transformers, motors and other electrical equipment.

At the present time the electrical industry makes considerable use of thermosetting compositions based on epoxy resins which have more than one oxirane group per average molecular weight through which they can be crosslinked to a thermoset state. However, epoxy resin compositions tend to cure to an overly rigid or brittle state for most electrical insulating uses, and it is customary to impart flexibility to the cured products by compounding the epoxy resin with various elastomers or other modifiers or by effecting the crosslinking with long-chain materials. Some such compositions must be heated for curing and others harden to a thermoset state at ordinary room temperatures, e.g., compositions containing long-chain polysulfides ("Thiokols") or polyamines of vegetable oil acids ("Versamids" or "Genamids"). Although the cured products of such compositions are termed "flexible," they do not have the combined flexibility and strength necessary to withstand the thermal-shock, mechanical-shock and vibration to which encapsulated electrical components are often subjected.

Epoxy resin compositions which do provide the proper balance of strength and flexibility of cured product necessary for electrical encapsulation use are described in my copending patent application S.N. 839,069, filed September 10, 1959, i.e., compositions of epoxy resin and long polyalkylene ether chains terminated with groups readily reactive with epoxy resin. Among such groups suggested in that patent application are carboxyl groups, which provide compositions that must be heated to cure, and amino groups which provide compositions that cure at ordinary room temperatures. However, mixtures of epoxy resin and amino-terminated polyalkylene ethers of relatively short chain (e.g. 6 ethers or less) do not provide sufficiently flexible cured products for most electrical encapsulating uses and also cure with considerable exotherm, so that the consumer must be warned not to use such mixtures in large masses, or charring might result. Where the polyalkylene ether chain is longer, the exotherm temperature is reduced and the cured products are more flexible, but tend to be deficient in toughness and have not found commercial acceptance as electrical encapsulating resins.

I have now discovered an epoxy resin composition which cures at room temperature to an extraordinarily strong, tough, flexible state and with sufficiently low exotherm to be used in large masses without danger of charring. Furthermore, the novel composition has good pot life, usually remaining usefully liquid or spreadable at room temperature for one to three hours in reasonably large masses. The ingredients of the composition of my invention may be selected to provide an initial paste-like consistency or may be selected to provide solvent-free, low-viscosity liquids which will penetrate minute interstices of electrical components encapsulated therewith. The novel compositions when cured in contact with metal, glass and other materials adhere tenaciously.

Briefly, my novel epoxy resin composition comprises a mixture of epoxy resin and an amino-terminated polyamide of polycarboxylic acid and compound of the formula

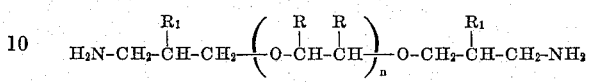

wherein $n$ is an integer of 1 to about 40, $R_1$ is selected from the group consisting of hydrogen and methyl, each R is selected from the group consisting of hydrogen and alkyl, and any two R's attached to adjoining carbon atoms together contain a total of not more than about 4 carbon atoms. The polyamide should be present in said mixture in an amount sufficient to provide about 0.03 to 0.8 amino ($NH_2$) group per oxirane group of the epoxy resin, i.e., in approximately equivalent amounts, when no other hardener is present.

Preferably the epoxy resin is a polyglycidyl ether. Among those which have demonstrated utility are condensation products of bisphenol A and epichlorhydrin such as the liquid "Epon 828," which has an epoxide equivalent weight of 175–210. Other useful polyglycidyl ethers are similarly prepared, e.g., by substituting other polyols such as glycerol or resorcinol for the bisphenol A. Typical is a polyglycidyl polyether of predominantly polypropylene glycol having an epoxide equivalent of about 330 and a viscosity at 25° C. of about 57 cps. ("Dow 2673.2"). A polyglycidyl ether which provides useful cured products, though of less flexibility, is "Epon 1310," the condensation product of 1,1,2,2-tetrakis(4-hydroxyphenyl)ethane and epichlorhydrin having an average of about 3 oxirane groups in the molecule. This epoxy resin has a Durrans' melting point of about 77–80° C. and an epoxide equivalent weight of about 208. Another useful polyglycidyl ether is epoxidized novolak, e.g., the semi-liquid "Den–438" which has an epoxide equivalent weight of about 180.

The amino-terminated polyamide of my novel epoxy resin composition may be prepared from any polycarboxylic acid, but particularly preferred are dimer fat acids or mixed dimer and trimer acids. Exemplary of such polymeric fat acids is "Empol 1022" which is prepared by polymerizing $C_{18}$ unsaturated fatty acids and has the following characteristics:

Acid value (mg. KOH/gm.) _____ 180.
Saponification value (mg. KOH/gm.) 185.
Unsaponifiables _____ Less than 2.0%.
Neutralization equivalent _____ 300.
Dimer content, $C_{36}$ _____ 72%.
Trimer content, $C_{54}$ _____ 22%.
Monomer content _____ 3%.
Specific gravity at 15.5° C./15.5° C. _ 0.95.
Viscosity at 25° C. _____ About 10,000 cps.

Suitable amino-terminated polyamides can also be prepared from shorter-chain polycarboxylic acids, but the cured products of mixtures with epoxy resin have somewhat less flexibility than where the polyamide is prepared from the polymeric fat acids.

When the polycarboxylic acid is of relatively short chain, i.e., of about 2 to 8 carbon atoms, it is preferred that the amino compound with which it is pre-reacted have an alkylene ether component

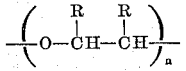

with a value for the integer $n$ of about 6 or higher to provide optimum flexibility in cured products of my invention. On the other hand, when the polycarboxylic acid is a polymeric fat acid, it is preferred that the value of $n$ be about 6 or less for the novel composition to cure at a good rate and to provide cured products of optimum toughness. Because of low cost and availability, polyethylene glycol and polypropylene glycol are preferred raw materials, and of these polypropylene glycol is generally preferred since its use permits the novel composition of my invention to be of lower viscosity and to cure to a more moisture-resistant state.

In preparing the amino-terminated polyamide, the amino-alkylene-ether compound should be employed in an amount providing at least 1.1 amino groups per carboxyl group of the polycarboxylic acid, and it is preferred to keep the ratio at 3:2 or above. The higher the ratio is, up to slightly over 2:1, the easier the reaction is to control, and the resultant polyamide is more uniform.

It will be appreciated by those skilled in the art that the skeletal chain of the amino-terminated polyamide may contain small proportions of other groups, e.g., the residue of ethylene diamine, without interfering with the ability of compositions with epoxy resin to cure quickly at room temperature without undue exotherm to a strong, flexible state. Furthermore, the novel epoxy resin compositions may contain other hardeners, monoepoxides or other reactive materials in reasonably small quantity.

The novel compositions may also incorporate finely divided inert matter, which may be used in very large amounts where the reactive ingredients are selected to provide especially low viscosity. For example, carbon black, silica, clays, zinc sulfide, micalith, asbestos fiber, powdered inert resins, and powdered metals or metal oxides may be employed to effect a cost reduction, to ease thermal strains, to lend particular electrical properties, to provide desired coloring, or for a variety of other reasons.

The addition to the novel compositions of small amounts of catalysts such as urea and phenol has been found to speed the rate of cure, but may also cause a slight increase in the exotherm temperature.

Preparation and properties of typical amino-terminated polyamides will now be described.

POLYAMIDE A

A 170-gallon stainless steel kettle equipped with Dowtherm-type heating and with a reflux condenser was purged with nitrogen and then charged with 167 pounds of toluene followed by 420 pounds of diethylene ether diamine having the formula:

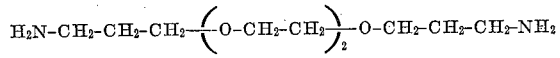

Over a period of 45 minutes with agitation there was added 504 pounds of polymeric fatty acid, specifically "Empol 1022" described hereinabove. The batch was heated to 155° C. with medium agitation to maintain a good reflux rate of toluene, and approximately 30 pounds of water was removed by decanter. Toluene was then stripped off until a batch temperature of 175° C. was reached, and then all toluene was drained and a vacuum of about 10 mm. was applied. The batch was heated to 195° C., held for 1.5 hours and purged with nitrogen through the bottom of the kettle during the last hour.

Viscosity of the product Polyamide A was 7100 cps. at 23° C. as measured by a Brookfield LVF viscometer (#4 spindle). When dissolved in acetic acid and titrated with perchloric acid, the neutralization equivalent was determined to be 453 grams per $NH_2$ group.

POLYAMIDE B

An amino-terminated polyethylene ether polyamide was prepared in the same manner as Polyamide A except using a 3-liter flask charged with 290 grams toluene, 727.1 grams (3.29 mols) of the same diethylene ether diamine, and 842.5 grams (1.5 mols) of "Empol 1018," which is similar to "Empol 1022" except that it contains about 83% dimerized unsaturated fat acid and 17% trimerized unsaturated fat acid. The product Polyamide B had a Brookfield viscosity at 24° C. of 7500 cps. and a neutralization equivalent of 460 grams per $NH_2$ group.

POLYAMIDE C

This amino-terminated polyethylene ether polyamide was prepared the same way as Polyamide B except that the 3-liter flask was charged with 190 grams toluene, 282.3 grams (1.5 mols) azelaic acid and 727.1 grams (3.29 mols) of the same diethylene ether diamine. The product Polyamide C was a waxy solid at 23° C. which melted about 95° C. and when heated to 105° C. was a low viscosity liquid, about 500 cps. Neutralization equivalent was 428.

POLYAMIDE D

This amino-terminated polyamide was prepared in the manner of Polyamide B except using 75 grams toluene, 59.1 grams (0.5 mol) succinic acid and 369.6 grams (1.2 mols, allowing for 31.4 grams of water) of polypropylene ether diamine of the approximate formula:

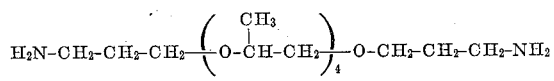

Neutralization equivalent of the product Polyamide D was 397. Brookfield viscosity was 1100 cps. at 23° C.

POLYAMIDE E

This amino-terminated polyamide was prepared by the procedure of Polyamide B except using 87 grams toluene, 134.5 grams (1.0 mol) adipic acid, and 340 grams (1.1 mols, allowing for 28.9 grams of water) of the polypropylene ether diamine used in Polyamide D. The product Polyamide E was a liquid of very high viscosity at 23° C., over 100,000 cps. Neutralization equivalent was 1600.

Illustrative compositions of my invention are described in the following examples employing liquid polyglycidyl ether epoxy resin of the type marketed as "Epon 828," described hereinabove.

Example 1

A mixture of 77.2 parts of Polyamide A, 2.8 parts of diethylene triamine, 19.99 parts of chlorinated biphenyl and 0.01 part dimethyl silicone anti-foam agent was prepared by simple cold blending. Brookfield viscosity of the mixture at 23° C. was 4600 cps.

A 100-gram mass of a composition of equal parts by weight of this hardener mixture and of liquid polyglycidyl ether in a 5-ounce paper cup at 23° C. gelled in 2 hours and 30 minutes, developed handleable strength in 6 hours, and cured in 16 hours to a hardness of 60 on the Shore durometer, D scale. Maximum exotherm temperature of the 100-gram mass was 76° C., measured with a thermocouple at the center of the mass. A 2-inch by 2-inch by 0.5-inch slab of the cured resin showed no failure when a steel ball weighing 7¾ pounds was dropped on it from 3 feet. A slab of the same size after 7 days in an oven at 120° C. experienced a weight loss of only 2.3%. Other samples cured overnight at 23° C. exhibited at 23° C. and 1000 cycles per second of a dielectric constant of 4.4 and a dissipation factor of 0.08. A cured specimen measuring one inch by 3 inches by ⅛ inch after 7 days immersion in water at 23° C. gained 1.3% in weight.

The uncured composition of this example was poured into an aluminum mold containing the ⅛-inch thermal shock insert described in "Thermal Shock Tests for Casting Resins," a paper presented by M. Olyphant to the "First National Conference on the Application of Electrical Insulation," at Cleveland, Ohio, September 3–5, 1958. The tough, adherent casting obtained after 18 hours at 23° C. was heated in an oven to 130° C. for 30 minutes and then plunged into a liquid bath at −55° C., but did not crack. After 10 minutes in the bath, the procedure was repeated. The test was discontinued after 10 cycles without failure, demonstrating superior thermal-shock resistance.

The uncured composition of this example filled 35% by weight with powdered talc was cured at room temperature in a 30-pound cylindrical mass approximately 8 inches in diameter and 11 inches in height. The mass gelled in about 70 minutes and hardened to a strong, tough homogeneous state. Maximum exotherm temperature at the center of the casting was 135° C., which was very low considering the speed with which this composition cures and considering the excellent strength and toughness of the cured product.

Mixtures of Polyamide A and liquid polyglycidyl ether alone cure at substantially the same rate to provide essentially equivalent cured products as compared to the composition of Example 1. However, the presence of the diethylene triamine was found to provide lowered viscosity and to reduce the cost of the composition.

Example 2

Fifty parts of the hardener mixture of Example 1, 46 parts of powdered talc and 4 parts of "Bentone 38" (ammonium organic complex in magnesium montmorillonite) were completely mixed and then put through a 3-roll paint mill with both orifices at 2 mils. The resultant composition was of heavy paste-like consistency and showed no flow at 60° C. This composition was mixed in equal parts with a 50:50 mixture of liquid polyglycidyl ether and powdered talc to provide a room-temperature-curing composition of the same paste-like consistency.

A 100-gram mass of the curable composition in a paper cup at 23° C. gelled in 3 hours and 10 minutes and cured overnight to a Shore D hardness of 75.

Samples of this composition which had been cured overnight at 23° C. were tested as in Example 1 with the following results:

| | |
|---|---|
| Mechanical shock | No failure with a 5-pound steel ball dropped from 3 feet. |
| Heat resistance (7 days at 120° C.) | 1.8% weight loss. |
| Dielectric constant (23° C., 1000 cycles) | 5.0. |
| Dissipation factor (23° C., 1000 cycles) | 0.10. |
| Water immersion (7 days at 23° C.) | 0.7% weight gain. |
| Thermal shock (¼-inch insert) | No failure after 10 cycles. |

The curable compositions of Examples 1 and 2 were together used to encapsulate the stator of a 5-horsepower motor having a stator winding about 10 inches in diameter. A tubular sleeve coated with silicone grease release agent was placed inside the stator, and the thixotropic composition of Example 2 was buttered around one end of the sleeve and cured for 30 minutes at 95° C. to seal that end. The pourable composition of Example 1 was then poured between the sleeve and stator and cured at 23° C. for 3 hours, after which the sleeve was removed. Although 1 pound of the thixotropic and 3 pounds of the pourable composition were used, there was no evidence of charring. The finished stator had a good appearance, the windings were well impregnated, and the cured resin was void-free. Mechanical and thermal shock resistance were excellent.

Example 3

A hardener mixture was prepared which was identical to that of Example 1 except that the Polyamide A was replaced by 77.2 parts of Polyamide B. This hardener mixture when mixed in equal parts by weight with liquid polyglycidyl ether, and a 100-gram mass of this composition in a paper cup gelled in 90 minutes at 23° C. and cured to a Shore D hardness of 45 after 18 hours. Peak exotherm temperature was 75° C.

Samples of this composition which had been cured overnight at 23° C. were tested as in Example 1 with the following results:

| | |
|---|---|
| Mechanical shock | No failure with a 7¾ pound steel ball dropped from 3 feet. |
| Heat resistance (7 days at 120° C.) | 3.1% weight loss. |
| Dielectric constant (23° C., 1000 cycles) | 5.5. |
| Dissipation factor (23° C., 1000 cycles) | 0.13. |
| Water immersion (7 days at 23° C.) | 1.3% weight gain. |
| Water immersion (7 days at 100° C.) | 7.2% weight gain. |

Example 4

Polyamide C was heated to 105° C. and then mixed in equal parts by weight with the liquid polyglycidyl ether (0.89 equivalent of hardener per epoxide equivalent). One hundred grams of this mixture, which initially had a temperature of 60° C., gelled after standing in a paper cup after about 13 minutes exposure to room temperature and cured within 18 hours to provide clear tough casting having a Shore D hardness of 50. Maximum exotherm temperature was 143° C.

A ⅛-inch thermal shock insert encapsulated with this curable composition as in Example 1 and cured for 2 hours at 60° C., passed the thermal shock test from 130° C. to −55° C., except that the test was discontinued after 3 cycles without failure.

Sixty grams of Polyamide C was heated to 105° C. and stirred into 40 grams of dimethylformamide solvent, and after cooling to room temperature, 40 grams of this solution was stirred together with 24 grams of liquid polyglycidyl ether. The resultant composition had a Brookfield viscosity of 6000 cps. and had a usable pot life of 8 hours at 23° C. It thickened after 18 hours at room temperature but became usefully liquid upon warming.

Pieces of 3-ounce electrolytic copper foil (3.8 mil thick) were dipped into this composition, and some were suspended in an oven for two hours at 60° C. to provide a tough, scrape-resistant insulating coating of 1.5-mil thickness on each side. Dielectric strength (ASTM D149-44) of the coating was 950 volts.

Other pieces of the coated foil were suspended at 23° C. for 18 hours to provide tough 4-mil insulating coatings, dielectric strength of which was 2400 volts.

Each of the insulating foils was creased sharply upon itself several times without cracking the insulation.

The solvent-containing composition of this example is particularly useful as an insulating coating for printed circuitry.

Example 5

One hundred grams of liquid polyglycidyl ether, 35 grams of Polyamide D (⅓ equivalent per epoxide equivalent), and 6.6 grams of diethylene triamine (⅔ equivalent per epoxide equivalent) were stirred together at room temperature to provide a curable composition 2600 cps. in viscosity (Brookfield). A 100-gram mass in a paper cup at room temperature gelled in one hour and 50 minutes and cured within 18 hours to a hard tough casting having a Shore D hardness of 75. Maximum exotherm temperature was 110° C.

A 10-mil thick film of this composition on a low-adhesion material cured overnight at 23° C. to provide a tough, flexible, self-sustaining film which could be bent double without breaking.

A ⅛-inch thermal shock insert encapsulated with this curable composition as in Example 1 and cured for 2 hours at 60° C. passed the thermal shock test from 130°

C. to −55° C., except that the test was discontinued after 3 cycles without failure.

*Example 6*

Used in this example as a co-hardener for epoxy resin was an amino-poly-imidazoline-amide of polymeric fat acids and excess aliphatic polyamine having an amine value of about 425–450 and a viscosity of about 800 cps. marketed under the trade name "Genamid 250." This co-hardener was melted together with Polyamide E at 95° C., and the mixture was blended at room temperature with liquid polyglycidyl ether (100 grams) to provide about 0.95 equivalent of the imidazoline-amide (45 grams) and 0.05 equivalent of the Polyamide E (45 grams) per epoxide equivalent. The blend, which had a Brookfield viscosity of 20,500 cps., gelled in a 100-gram mass in a paper cup in about 3 hours at 23° C. with a maximum exotherm temperature of 50° C. Shore D hardness after 18 hours was 55.

A ⅛-inch thermal shock insert encapsulated with this curable blend as in Example 1 was cured for 2 hours at 60° C. The encapsulated insert was placed in an oven at 130° C. for 30 minutes and then moved to a freezer at −5° C. but did not crack. However, when the encapsulated insert was returned to the oven for 30 minutes at 130° C. and then plunged into a −55° C. bath, fine cracks appeared in the casting.

Because the compositions of my invention harden at room temperature, they must be marketed in two containers. As will be seen from many of the examples, it is usually feasible to put equal parts in each container. Not only is this a distinct advantage from a marketing point of view, but mixing is facilitated.

Hardeners for epoxy resin which have been used with good results in my novel compositions along with the amino-terminated polyamides include aminoethyl piperazine. In fact, any amine having at least 2 active amino-hydrogens can be incorporated into these compositions in amounts not exceeding the weight of the amino-terminated polyamide. For example, the unreacted diethylene ether diamine (the viscosity of which is 15–20 cps.) used in making Polyamide A may be added in small quantity. A usual purpose for such addition is to reduce the viscosity of the composition, so that it is preferred that the added amine have a viscosity below 1000 cps. The added amine also generally results in somewhat harder cured products.

I claim:

1. An epoxy resin composition which has good pot life and low exotherm when cured in large masses but which cures at ordinary room temperatures to provide products having excellent resistance to thermal and mechanical shock, said composition comprising a mixture of (1) polyglycidyl ether and (2) an amino-terminated polyamide of (a) polymeric fat acid and (b) a compound of the formula

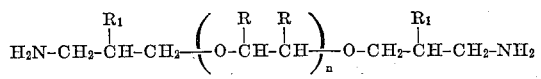

wherein $n$ is an integer of from 1 to about 6, $R_1$ is selected from the group consisting of hydrogen and methyl, each R is selected from the group consisting of hydrogen and alkyl, and any two R's attached to adjoining carbon atoms together contain a total of not more than 4 carbon atoms; and where said polyamide is the sole hardener for the polyglycidyl ether, it is present in said mixture in an amount sufficient to provide about 0.3 to 0.8 amino group per oxirane group.

2. An epoxy resin composition which has good pot life and low exotherm when cured in large masses but which cures overnight at ordinary room temperatures to provide products having excellent resistance to thermal and mechanical shock, said composition comprising a mixture of (1) polyglycidyl ether and (2) an amino-terminated polyamide of (a) mixed dimer and trimer fat acids and (b) a compound of the formula

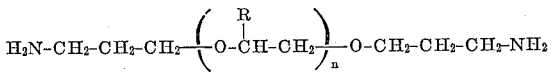

wherein $n$ is an integer of from 2 to 4 and R is selected from the group consisting of hydrogen and methyl; and where said polyamide is the sole hardener for the polyglycidyl ether, it is present in said mixture in an amount sufficient to provide about 0.3 to 0.8 amino group per oxirane group.

3. An epoxy resin composition which has good pot life and low exotherm when cured in large masses but which cures at ordinary room temperatures to provide products having excellent resistance to thermal and mechanical shock, said composition comprising a mixture of (1) polyglycidyl ether and (2) an amino-terminated polyamide of (a) dicarboxylic acid, the carboxyl groups of which are separated by a chain of about 2 to 8 carbon atoms, and (b) a compound of the formula

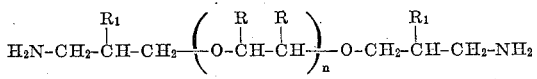

wherein $n$ is an integer of about 6 to 40, $R_1$ is selected from the group consisting of hydrogen and methyl, each R is selected from the group consisting of hydrogen and alkyl, and any two R's attached to adjoining carbon atoms together contain a total of not more than 4 carbon atoms; and where said polyamide is the sole hardener for the polyglycidyl ether, it is present in said mixture in an amount sufficient to provide about 0.3 to 0.8 amino group per oxirane group.

4. An epoxy resin composition which provides cured products having excellent resistance to thermal and mechanical shock, said composition comprising a mixture of (A) polyglycidyl ether and (B) a mixture of (1) a minor proportion by weight of an amine of less than about 1000 cps. having at least 2 active hydrogens, and (2) a major proportion by weight of an amino-terminated polyamide of (a) polycarboxylic acid selected from the group consisting of polymeric fat acids and aliphatic dicarboxylic acid wherein the carboxyl groups are separated by a chain of about 2 to 8 carbon atoms, and (b) a compound of the formula

wherein $n$ is an integer of from 1 to about 40, $R_1$ is selected from the group consisting of hydrogen and methyl, each R is selected from the group consisting of hydrogen and alkyl, and any two R's attached to adjoining carbon atoms together contain a total of not more than 4 carbon atoms; said mixture including sufficient amine and polyamide to provide about 0.6 to 1.6 active hydrogens per oxirane group.

5. An epoxy resin composition which has good pot life and low exotherm when cured in large masses but which cures at ordinary room temperatures to provide resinous products having excellent resistance to thermal and mechanical shock, said composition comprising a mixture of (1) epoxy resin having more than one oxirane group per average molecular weight and (2) an amino-terminated polyamide of (a) a polycarboxylic acid selected from the group consisting of polymeric fat acids and aliphatic dicarboxylic acid wherein the carboxyl groups are separated by a chain of about 2 to 8 carbon atoms, and (b) a compound of the formula

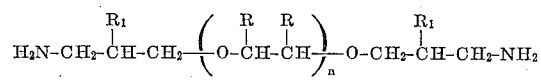

wherein $n$ is an integer of from 1 to about 40, $R_1$ is selected from the group consisting of hydrogen and methyl, each R is selected from the group consisting of hydrogen and alkyl, and any two R's attached to adjoining carbon atoms together contain a total of not more than 4 carbon atoms; and where said polyamide is the sole hardener for the epoxy resin, it is present in said mixture in an amount sufficient to provide about 0.3 to 0.8 amino group per oxirane group.

6. An epoxy resin composition which has good pot life and low exotherm when cured in large masses but which cures at ordinary room temperatures to provide resinous products having excellent resistance to thermal and mechanical shock, said composition comprising a mixture of (1) polyglycidyl ether and (2) an amino-terminated polyamide of (a) polymeric fat acid, and (b) a compound of the formula

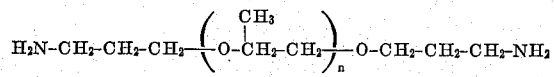

wherein $n$ is an integer of from 1 to about 6, the proportion of amino groups of said compound (b) to carboxyl groups of said acid (a) extending from about 1.1 to 2; and where said polyamide is the sole hardener for the polyglycidyl ether, it is present in said mixture in an amount sufficient to provide about 0.3 to 0.8 amino group per oxirane group.

References Cited by the Examiner
UNITED STATES PATENTS

| | | | |
|---|---|---|---|
| 2,327,116 | 8/1943 | Loder | 260—78 |
| 2,359,867 | 10/1944 | Martin | 260—78 |
| 2,705,223 | 3/1955 | Renfrew et al. | 260—18 |
| 2,723,241 | 11/1955 | De Groote et al. | 260—52 XR |
| 2,880,197 | 3/1959 | Coleman | 260—78 |
| 3,019,076 | 1/1962 | Pardo et al. | 260—18 XR |

FOREIGN PATENTS

| | | |
|---|---|---|
| 574,713 | 1/1946 | Great Britain. |

OTHER REFERENCES

Epoxy Resins; Skeist, Reinhold, N.Y., 1958, p. 71.

LEON J. BERCOVITZ, *Primary Examiner.*

ALFONSO D. SULLIVAN, *Examiner.*

T. D. KERWIN, C. W. IVY, *Assistant Examiners.*